(12) United States Patent
Shi et al.

(10) Patent No.: US 12,212,131 B2
(45) Date of Patent: Jan. 28, 2025

(54) POWER SUPPLY DEVICE FOR MOTOR PROTECTOR AND POWER SUPPLYING METHOD THEREOF

(71) Applicant: Schneider Electric Industries SAS, Rueil-Malmaison (FR)

(72) Inventors: Ying Shi, Shanghai (CN); Haijun Zhao, Shanghai (CN); Fabien Dechamps, Eybens (FR); Zhangji Zhou, Shanghai (CN); Shuang Sun, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 686 days.

(21) Appl. No.: 17/377,858

(22) Filed: Jul. 16, 2021

(65) Prior Publication Data

US 2022/0021200 A1    Jan. 20, 2022

(30) Foreign Application Priority Data

Jul. 16, 2020    (CN) .......................... 202010686618.3

(51) Int. Cl.
*H02P 27/14*    (2006.01)
*H02H 7/085*    (2006.01)
*H02P 9/14*    (2006.01)

(52) U.S. Cl.
CPC ........ *H02H 7/0856* (2013.01); *H02H 7/0851* (2013.01)

(58) Field of Classification Search
CPC ................................ H02M 3/156; H02M 1/36
See application file for complete search history.

(56) References Cited

U.S. PATENT DOCUMENTS

| 5,276,416 A | 1/1994 | Ozaki |
| 6,710,988 B1 | 3/2004 | Yee et al. |
| 2008/0048624 A1* | 2/2008 | Davison ............... H02H 7/0822 320/166 |

(Continued)

FOREIGN PATENT DOCUMENTS

| CN | 104377816 A | 2/2015 |
| KR | 20150064840 A | 6/2015 |

OTHER PUBLICATIONS

Korean Office Action dated Jan. 26, 2023 for corresponding Korean Patent Application No. 10-2021-0092329, 4 pages.

(Continued)

*Primary Examiner* — Kawing Chan
*Assistant Examiner* — Charles S Laughlin
(74) *Attorney, Agent, or Firm* — Locke Lord LLP (57) ABSTRACT

The disclosure relates to a power supply device for a motor protector and a power supplying method thereof. The motor protector receives power. The power supply device comprises: a first power supplying unit, configured to receive and store the power and supply power to a tripping device of the motor protector; a second power supplying unit, configured to receive the power and supply power to a calculation and control device of the motor protector; a third power supplying unit, configured to receive and store the power and supply power to a reclosing device of the motor protector; and a control unit, configured to control an order in which the first power supplying unit, the second power supplying unit and the third power supplying unit receive the power.

16 Claims, 6 Drawing Sheets

(56) References Cited

U.S. PATENT DOCUMENTS

2013/0307471 A1* 11/2013 Ichikawa .............. B60L 53/126
                                                        320/108
2016/0164310 A1    6/2016 Juntunen et al.

OTHER PUBLICATIONS

Extended European Search Report dated Dec. 1, 2021 for corresponding European Patent Application No. 21305855.5-1202, 8 pages.

* cited by examiner

POWER SUPPLY DEVICE FOR MOTOR PROTECTOR AND POWER SUPPLYING METHOD THEREOF

TECHNICAL FIELD

The disclosure relates to a power supply device for a motor protector and a power supplying method thereof, in particular to a power supply device for a motor protector which can implement ground fault protection function more quickly and simultaneously take automatic reclosing function into account and a power supplying method thereof.

BACKGROUND

A motor protector is generally used to start and protect a motor. The protection functions of a motor protector may include thermal overload protection, ground fault protection and lack-phase protection, etc. When an insulation failure occurs within the motor and causes ground current, it is necessary to implement the ground fault protection. The purpose of the ground fault protection is to prevent further failure of insulation which may eventually cause short circuit fault, therefore the protection requires a short response time. For example, in standard IEC 60947-1 relating to low-voltage switchgear and control device formulated by International Electrotechnical Commission (IEC), it is required that class A devices should be tripped within one second in a case that the 1.1 times of the threshold of the ground fault protection is reached.

A motor protector that provides the ground fault protection function may be powered by an auxiliary power supply or self-powered. A motor protector powered by the auxiliary power supply requires customers to provide extra power supply on site and to add extra wiring. A self-powered motor protector is generally powered by current, and the power it can receive and the time used for starting and completing the protection function are affected by a load current of the motor.

SUMMARY

The present disclosure relates to a power supply device for the motor protector and a power supplying method thereof, which can start and implement the ground fault protection function more quickly and simultaneously take the automatic reclosing function of the motor protector into account in a case of thermal overload.

According to one aspect of the disclosure, a power supply device for a motor protector is provided, the motor protector receives power by inducing alternating current in a power supply line of a motor via a power supplying coil and converting the induced alternating current into direct current utilizing a rectifier device, the power supply device comprising: a first power supplying unit, configured to receive and store the power, and supply power to a tripping device of the motor protector; a second power supplying unit, configured to receive the power and supply power to a calculation and control device of the motor protector; a third power supplying unit, configured to receive and store the power, and supply power to a reclosing device of the motor protector; and a control unit, configured to control an order in which the first power supplying unit, the second power supplying unit and the third power supplying unit receive the power, so that the power is firstly received by the first power supplying unit, and then received by the second power supplying unit and finally received by the third power supplying unit.

According to another aspect of the disclosure, a power supplying method of a power supply device for a motor protector is provided, the motor protector receives power by inducing alternating current in a power supply line of a motor via a power supplying coil and converting the induced alternating current into direct current utilizing a rectifier device, the power supply device comprises a first power supplying unit, a second power supplying unit, a third power supplying unit and a control unit, the power supplying method comprising: by the first power supplying unit, receiving and storing the power, and supplying power to a tripping device of the motor protector; by the second power supplying unit, receiving the power and supplying power to a calculation and control device of the motor protector; by the third power supplying unit, receiving and storing the power, and supplying power to a reclosing device of the motor protector, wherein, the control unit controls an order in which the first power supplying unit, the second power supplying unit and the third power supplying unit receive the power, so that the power is firstly received by the first power supplying unit, then received by the second power supplying unit and finally received by the third power supplying unit.

According to embodiments of the disclosure, the first, the second and the third power supplying units are provided to supply power to the tripping device, the calculation and control device, and the reclosing device of the motor protector, respectively. By controlling the order in which the first, the second and the third power supplying units receive power, the first power supplying unit associated with the tripping device for implementing the ground fault protection function can be given the highest priority for energy storage, so that the ground fault protection function can be started and implemented more quickly even in a case of small rated current. At the same time, according to embodiments of the disclosure, the energy storage of the reclosing device associated with the automatic reclosing function of the motor protector in a case of thermal overload is considered, so that the automatic reclosing function can be taken into account while implementing the ground fault protection function.

BRIEF DESCRIPTION OF THE DRAWINGS

The aspects, features and advantages of the disclosure will become clearer and easier to understand from the following description of embodiments taken in conjunction with drawings, wherein.

DETAILED DESCRIPTION

Hereinafter, the disclosure will be described in detail with reference to exemplary embodiments thereof. However, the disclosure is not limited to the embodiments described herein, but may be implemented in many different forms. The described embodiments are only used to make this disclosure thorough and complete, and to fully convey the concepts of this disclosure to those skilled in the art. The features of the described various embodiments may be combined or replaced with each other unless explicitly excluded or should be excluded according to the context.

A self-powered motor protector receives the power via the power supplying coil, so as to supply power for each circuit or device within the motor protector. Specifically, a three-phase alternating current in a power supply line of a motor is induced by a three-phase current transformer (i.e., the power supplying coil) of a motor protector, then the induced alternating current is converted into direct current by a rectifier device of the motor protector, and each circuit or device in the motor protector is powered by the direct current. Accordingly, the power that the self-powered motor protector can receive and the time to start and complete the protection function are related to the load current of the motor. For example, in a case that the load current is the minimum rated current, the output power of the power supplying coil is only 100 mW, and the driving power required by the tripping device within the motor protector is about 600 mW, thus it may not be ensured that tripping can be completed in the event of a ground fault.

An embodiment of the disclosure provides a power supply device for a motor protector, the power supply device is provided with the first power supplying unit, the second power supplying unit and the third power supplying unit to supply power to the tripping device, the calculation and control device, and the reclosing device of the motor protector respectively. The first power supplying unit is associated with the tripping device that implements a ground fault protection function, and can pre-store power for tripping. By controlling the order in which the first, the second and third power supplying units receive power, the first power supplying unit can be given the highest priority for energy storage, so that the ground fault protection function can be started and implemented more quickly (for example, within 1 second) even in a case of small rated current. In addition, according to the embodiment of the disclosure, the third power supplying unit is associated with the reclosing device which implements the automatic reclosing function of the motor protector in a case of the thermal overload, and can pre-store the power for automatic reclosing, so that the automatic reclosing function can also be taken into account while implementing the ground fault protection function.

Figure 1:
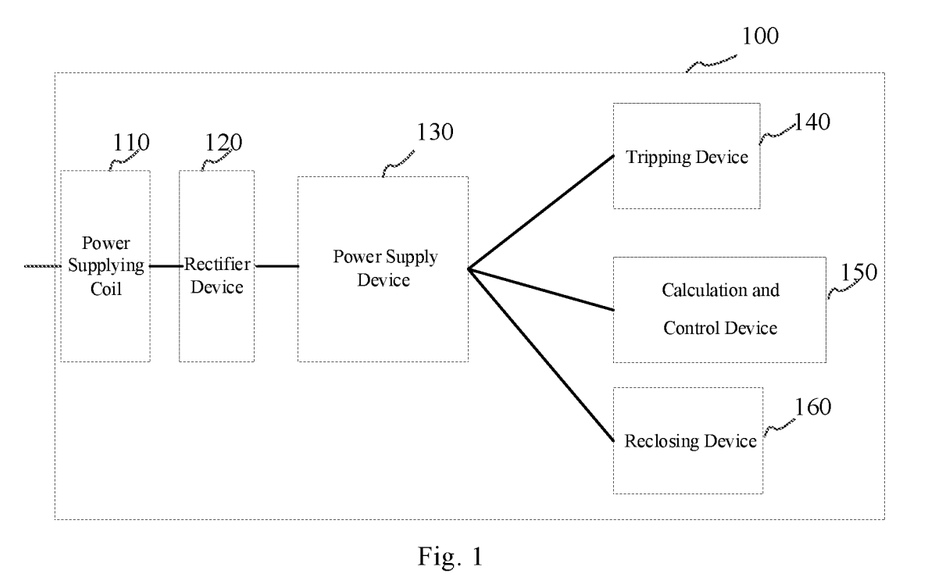
FIG. 1 is a schematic circuit module diagram of a self-powered motor protector according to an embodiment of the disclosure.

FIG. 1 is a schematic circuit module diagram of a self-powered motor protector 100 according to an embodiment of the disclosure. As shown in FIG. 1, the motor protector 100 includes a power supplying coil 110, a rectifier device 120, a power supply device 130, a tripping device 140, a calculation and control device 150, and a reclosing device 160. The power supplying coil 110 induces three-phase alternating current in the power supply line of the motor, and then the rectifier device 120 converts the induced alternating current into direct current. The power supply device 130 receives the direct current and supplies power to the tripping device 140, the calculation and control device 150, and the reclosing device 160 in the motor protector 100 respectively. The tripping device 140 is configured to implement the tripping function in a case of fault or overload. The calculation and control device 150 which may be, for example, a micro-control unit (MCU), and is configured for calculation and control logic processes such as calculating the ground fault current, judging whether a fault occurs, and controlling whether to drive the tripping device 140, etc. The reclosing device 160 is configured to implement the automatic reclosing function after a predetermined time elapses from tripping due to thermal overload.

Figure 2:
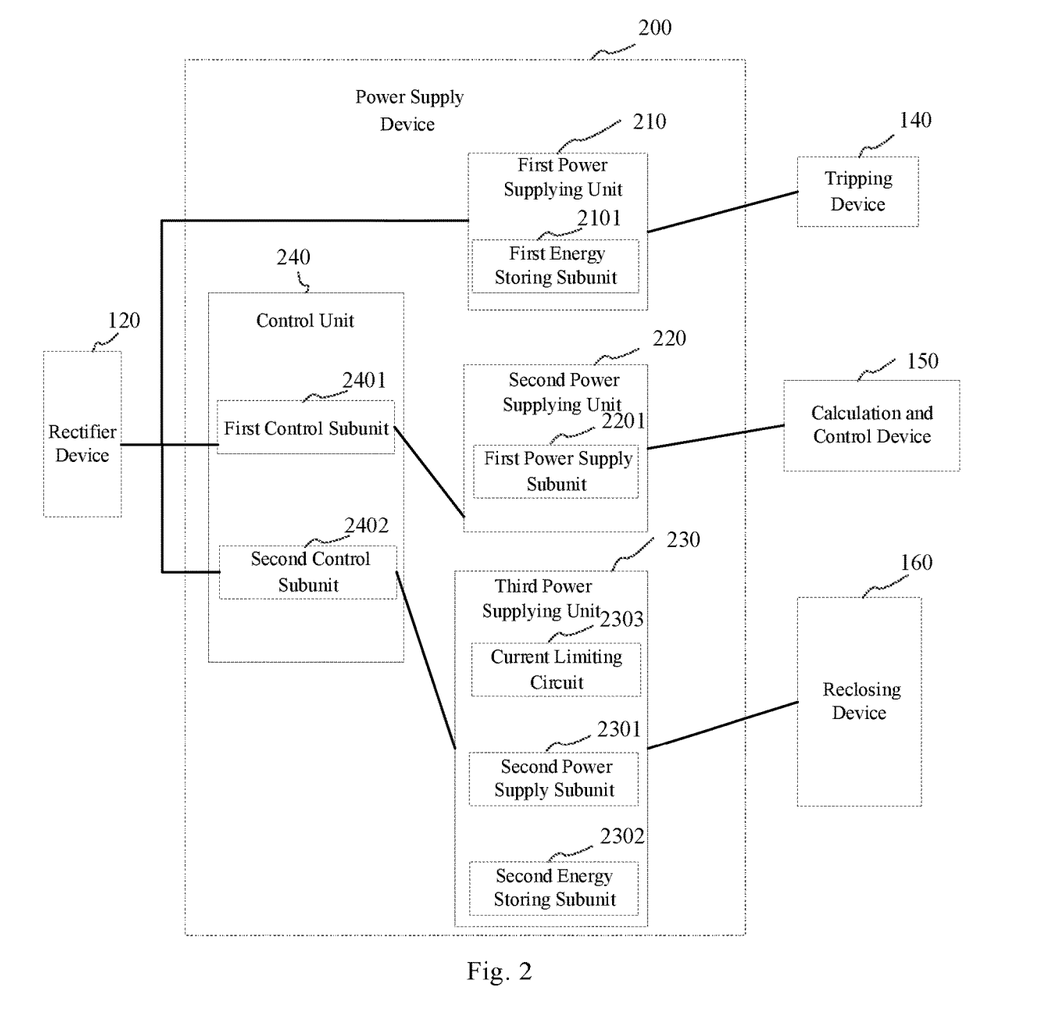
FIG. 2 is a schematic circuit module diagram of a power supply device according to an embodiment of the disclosure.

FIG. 2 is a schematic circuit module diagram of a power supply device 200 for a motor protector according to an embodiment of the disclosure. The power supply device 200 may include a first power supplying unit 210 configured to receive and store the power and supply power to the tripping device 140 of the motor protector. As mentioned above, in a case that the load current is the minimum rated current, the output power of the power supplying coil may not meet the driving power required by the tripping device in the motor protector, so that it can't be ensured that tripping is completed in the event of a ground fault. Accordingly, it is required to pre-store power for tripping. In an embodiment, as shown in FIG. 2, the first power supplying unit 210 may include a first energy storing subunit 2101 configured to receive the power to store the power, and supply power to the tripping device 140 of the motor protector by utilizing the stored power, so that to ensure that there is enough driving power to drive the tripping device 140 when a ground fault occurs.

The power supply device 200 may further include a second power supplying unit 220 configured to receive power and supply power to the calculation and control device 150 of the motor protector. As mentioned above, the calculation and control device 150 may be a micro control unit (MCU), and the power supply voltage for MCU is generally 3.3V. Accordingly, it is required to decrease the input voltage to about 3.3V for providing to MCU. In an embodiment, as shown in FIG. 2, the second power supplying unit 220 may include a first power supply subunit 2201 configured to receive the power and supply power to the calculation and control device 150 at a first output voltage (for example, 3.3V) required by the calculation and control device 150. The first output voltage may be set according to the practical configuration of the circuit.

As described above, the motor protector according to the disclosure can also take the automatic reclosing function into account while implementing the ground fault protection function. Accordingly, the power supply device 200 may further include a third power supplying unit 230 configured to receive and store the power, and supply power to the reclosing device 160 of the motor protector. After the tripping device 140 is tripped, the motor stops running, the power supplying coil 110 can't induce current, so that there is no power supplying current for the motor protector. Accordingly, it is required to pre-store power for automatic reclosing. In an embodiment, as shown in FIG. 2, the third power supplying unit 230 may include a second energy storing subunit 2302 configured to store the power and supply power to the reclosing device 160 utilizing the stored power. In addition, a relatively high input voltage is required by the second energy storing subunit 2302 because a relatively high driving power is required by the reclosing device 160. In this case, the third power supplying unit 230 may further include a second power supply subunit 2301 configured to receive the power and supply power to the second energy storing subunit 2302 at a second output voltage (for example, 30V or higher) required by the second energy storing subunit 2302, the second output voltage may be set according to the practical configuration of the circuit. In another embodiment, in order to avoid excessive instantaneous current flowing into the second power supply subunit 2301, as shown in FIG. 2, the third power supplying unit 230 may further include a current limiting circuit 2303. The current limiting circuit 2303 is connected between the second power supply subunit 2301 and the rectifier device 120 (for example, connected to the rectifier device 120 via the control unit 240) to make the current flowing from the rectifier device 120 into the second power supply subunit 2301 be less than or equal to the first current threshold Cth1. The first current threshold Cth1 may be set according to the practical configuration of the circuit.

According to the embodiment of the disclosure, the first power supplying unit 210, the second power supplying unit 220 and the third power supplying unit 230 are provided in the power supply device 200 to supply power to the tripping device 140, the calculation and control device 150, and the reclosing device 160 of the motor protector respectively. However, as described above, a trip time is also required (for example, within 1 second), for example, in the standard IEC 60947-1. If the time for supplying power to the tripping device 140, the calculation and control device 150, and the reclosing device 160 is not limited, for example, if they are supplied with power at the same time, the time for the first energy storing subunit 2101 to store the power will be affected, so that the time for starting and implementing the ground fault protection will also be affected.

In order to implement the ground fault protection function more quickly, the power supply device according to the embodiment of the disclosure also controls the timing of receiving power by the first power supplying unit 210, the second power supplying unit 220, and the third power supplying unit 230.

As mentioned above, the ground fault protection function requires short trip time, accordingly, from the perspective of power supplying, the first power supplying unit 210 should be given the highest priority so that it can receive and store full power as soon as possible. Storing full power means that even if the power supplying coil does not provide current at all, the stored power is enough to drive the tripping device.

Secondly, only when the calculation and control device 150 is in operation, operations such as calculating the ground fault current, judging whether a fault occurs and controlling whether to drive the tripping device 140 can be implemented, accordingly, from the perspective of power supplying, the second power supplying unit 220 should be given a priority second only to the first power supplying unit 210.

Finally, the automatic reclosing function is allowed to be performed only in a case that tripping is caused by thermal overload, while the automatic reclosing function is not required to be performed in a case that only a ground fault occurs. For overload protection, in a case that the overload current is small (for example, 1.2 times of the rated current), the cold trip time approximately ranges from 30 minutes to 2 hours, and the hot trip time is also greater than 1 minute, accordingly the delay in supplying power to the third power supplying unit 230 is allowed. However, in a case that the overload current is large (for example, 7.2 times of the rated current), the power supplying capability of the power supplying coil is strong to enable the first power supplying unit 210 to quickly complete power storage and supply power to the second power supplying unit 220, and to enable the third power supplying unit 230 to begin to receive the power. In addition, before performing the automatic reclosing function, for example, the MCU needs to judge various conditions such as the magnitude of real-time current, current heat capacity value and the time for power-on, etc., and the automatic reclosing can be performed only when all the conditions are met. Accordingly, from the perspective of power supplying, the priority of the third power supplying unit 230 is lowest.

Accordingly, as shown in FIG. 2, the power supply device 200 may further include the control unit 240 configured to control the order in which the first power supplying unit 210, the second power supplying unit 220 and the third power supplying unit 230 receive the power, so that the power is firstly received by the first power supplying unit, and then received by the second power supplying unit and finally received by the third power supplying unit, thus the ground fault protection function can be started and implemented more quickly even when the rated current is small, and in the meanwhile, the automatic reclosing function is also taken into account.

In an embodiment, as shown in FIG. 2, the above mentioned timing control is implemented by providing a first control subunit 2401 and a second control subunit 2402 in the control unit. The first control subunit 2401 is connected between the rectifier device 120 and the second power supplying unit 220. Specifically, the first input terminal of the first control subunit 2401 is connected with the output terminal of the rectifier device 120, and the output terminal of the first control subunit 2401 is connected with the second power supplying unit 220. The first control subunit 2401 controls the second power supplying unit 220 to begin to receive the power only when the voltage at the first input terminal of the first control subunit 2401 is higher than a first voltage threshold Vth1. When the voltage at the first input terminal of the first control subunit 2401 is higher than the first voltage threshold Vth1, it indicates that the first power supplying unit 210 has completed the storage of power, so that the second power supplying unit 220 may begin to receive the power, thereby ensuring that the first power supplying unit 210 receives the power before the second power supplying unit 220.

The second control subunit 2402 is connected between the rectifier device 120 and the third power supplying unit 230. Specifically, the first input terminal of the second control subunit 2402 is connected with the output terminal of the rectifier device 120, and the output terminal of the second control subunit 2402 is connected with the third power supplying unit 230. The second control subunit 2402 controls the third power supplying unit 230 to begin to receive the power only when the voltage of the first input terminal of the second control subunit 2402 is higher than a second voltage threshold Vth2. The second voltage threshold Vth2 may be higher than the first voltage threshold Vth1 to ensure that the second power supplying unit 220 receives the power before the third power supplying unit 230.

In a case that the second power supplying unit 220 and/or the third power supplying unit 230 have/has begun to receive the power, the power supplying capability of the power supplying coil may decrease for some reason, so that the normal operation of the first power supplying unit may be affected. For example, when the power supplying capability of the power supplying coil decreases and it is insufficient to supply power to the second power supplying unit 220 and/or the third power supplying unit 230, the second power supplying unit 220 and/or the third power supplying unit 230 may draw the power from the power stored in the first power supplying unit 210, so that the normal operation of the first power supplying unit 210 may be affected. In order to avoid this situation, the control unit 240 may also limit the timing when the second power supplying unit 220 and the third power supplying unit 230 stop receiving the power. In an embodiment, when the voltage of the first input terminal of the first control subunit 2401 is lower than a third voltage threshold Vth3, the first control subunit 2401 controls the second power supplying unit 220 to stop receiving power. A third voltage threshold Vth3 may be lower than or equal to the first voltage threshold Vth1, that is, the voltage thresholds for controlling the second power supplying unit 220 to begin to receive and to stop receiving the power may be the same or different. Compared with the case where the third voltage threshold Vth3 is equal to the first voltage threshold Vth1, the time for controlling the second power supplying unit 220 to receive the power can be extended in a case that the third voltage threshold Vth3 is lower than the first voltage threshold Vth1. In another embodiment, when the voltage of the first input terminal of the second control subunit 2402 is lower than a fourth voltage threshold Vth4, the second control subunit 2402 controls the third power supplying unit 230 to stop receiving power. The fourth voltage threshold Vth4 may be lower than or equal to the second voltage threshold Vth2, that is, the voltage thresholds for controlling the third power supplying unit 230 to begin to receive and to stop receiving the power may be the same or different. Compared with the case where the fourth voltage threshold Vth4 is equal to the second voltage threshold Vth2, the time for controlling the third power supplying unit 230 to receive power can be extended in a case that the fourth voltage threshold Vth4 is lower than the second voltage threshold Vth2. The fourth voltage threshold Vth4 may be higher than the third voltage threshold Vth3, so that when the power supplying capability of the power supplying coil is insufficient, the third power supplying unit 230 is first made to stop receiving power, and when the power supplying capability of the power supplying coil continues to deteriorate, the second power supplying unit 220 is made to stop receiving power.

Figure 3:
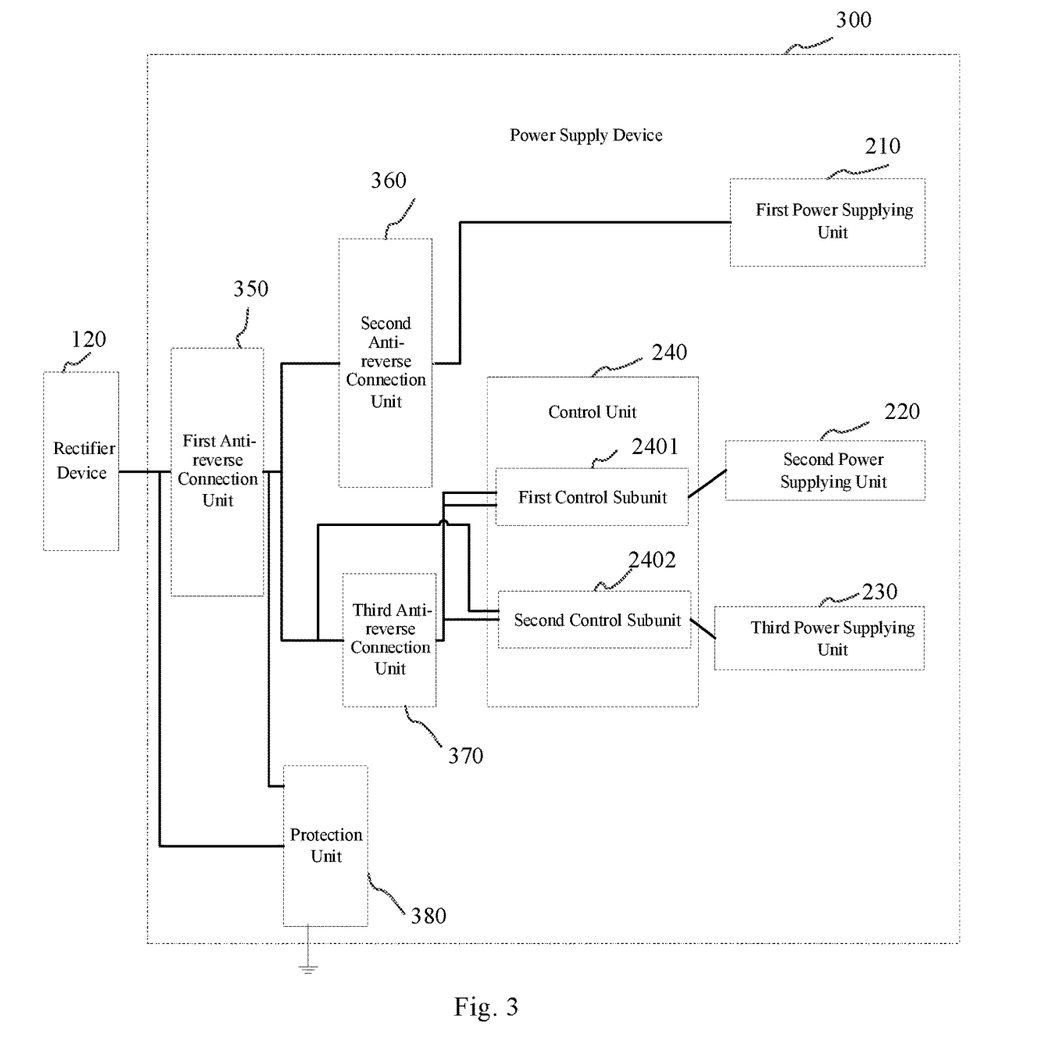
FIG. 3 is a schematic circuit module diagram of a power supply device according to another embodiment of the disclosure.

In another embodiment, in order to ensure that the first and third power supplying units can store the power separately and reduce the mutual influence among the first to third power supplying units decrease (i.e., the anti-reverse connection function), an anti-reverse connection unit may also be added, as shown in FIG. 3. FIG. 3 is a schematic circuit module diagram of a power supply device 300 according to another embodiment of the disclosure, the difference between FIG. 3 and FIG. 2 is that the power supply device 300 in FIG. 3 further includes a first anti-reverse connection unit 350, a second anti-reverse connection unit 360 and a third anti-reverse connection unit 370. The input terminal of the first anti-reverse connection unit 350 is connected with the output terminal of the rectifier device 120, and the output terminal of the first anti-reverse connection unit 350 is connected with the input terminal of the second anti-reverse connection unit 360 and the input terminal of the third anti-reverse connection unit 370 respectively, for providing anti-reverse connection for the whole power supply device. The output terminal of the second anti-reverse connection unit 360 is connected with the first power supplying unit 210 for providing further anti-reverse connection for the first power supplying unit 210. The input terminal and output terminal of the third anti-reverse connection unit 370 are connected with the control unit 240 respectively, specifically, the output terminal of the third anti-reverse connection unit 370 are connected with the first input terminal and the second input terminal of the first control subunit 2401 respectively, thus providing further anti-reverse connection for the subsequent second power supplying unit 220. In addition, in an embodiment, an additional anti-reverse connection unit may be provided in the current limiting circuit 2303 included in the third power supplying unit 230 to provide further anti-reverse connection for the third power supplying unit 230. In yet another embodiment, the output terminal of the third anti-reverse connection unit 370 may also be connected with the first input terminal and the second input terminal of the second control subunit 2402 respectively, so as to provide further anti-reverse connection for the subsequent third power supplying unit 230. In yet another embodiment, the additional anti-reverse connection unit may be provided in each of the first to third power supplying units to provide further anti-reverse connection. In addition, as shown in FIG. 3, in a case that respective anti-reverse connection units are provided, the first input terminal of the second control subunit 2402 can be connected with the output terminal of the third anti-reverse connection unit 370, and the second input terminal of the second control subunit 2402 can be connected with the input terminal of the third anti-reverse connection unit 370, so as to control the reception of power by the third power supplying unit 230.

In yet another embodiment, in order to avoid the elements in the power supply device are damaged due to the excessive current and voltage flowing into the power supply device from the power supplying coil, a protection unit 380 may also be added, as shown in FIG. 3. The first input terminal of the protection unit 380 is connected with the output terminal of the first anti-reverse connection unit 350, the second input terminal is connected with the output terminal of the rectifier device 120, and the output of the protection unit 380 is connected with the reference ground. When the voltage at the first input terminal of the protection unit 380 is higher than a fifth voltage threshold value Vth5 due to the excessive current and voltage flowing from the power supplying coil into the power supply device, the protection unit 380 can discharge the excessive current and voltage to the reference ground, so that the first power supplying unit 210, the second power supplying unit 220 and the third power supplying unit 230 stop receiving the power. In a case that the first power supplying unit 210, the second power supplying unit 220 and the third power supplying unit 230 stop receiving the power, when the voltage at the first input terminal of the protection unit 380 is lower than a sixth voltage threshold Vth6 due to the release of power stored in the first and third power supplying units, the first power supplying unit 210, the second power supplying unit 220 and the third power supplying unit 230 can resume receiving power. That is, when the voltage of the first input terminal of the protection unit 380 is lower than the sixth voltage threshold Vth6, the protection unit 380 can enable the first power supplying unit 210 to begin to receive power, so that the second power supplying unit 220 and the third power supplying unit 230 can also receive power subsequently based on the control of the control unit 240. The sixth voltage threshold Vth6 may be lower than the fifth voltage threshold Vth5 to ensure that elements in the power supply device will not be damaged.

According to the above embodiments of the disclosure, the first, the second and the third power supplying units are provided in the power supply device for the self-powered motor protector to supply power to the tripping device, the calculation and control device, and the reclosing device of the motor protector respectively. By controlling the order in which the first, the second and the third power supplying units receive power, the first power supplying unit can be given the highest priority for energy storage, so that the ground fault protection function can be started and implemented more quickly (for example, within 1 second) even in a case of small rated current. In addition, the third power supplying unit can pre-store the power for automatic reclosing, so that the automatic reclosing function can be taken into account while implementing the ground fault protection function.

Figure 4:
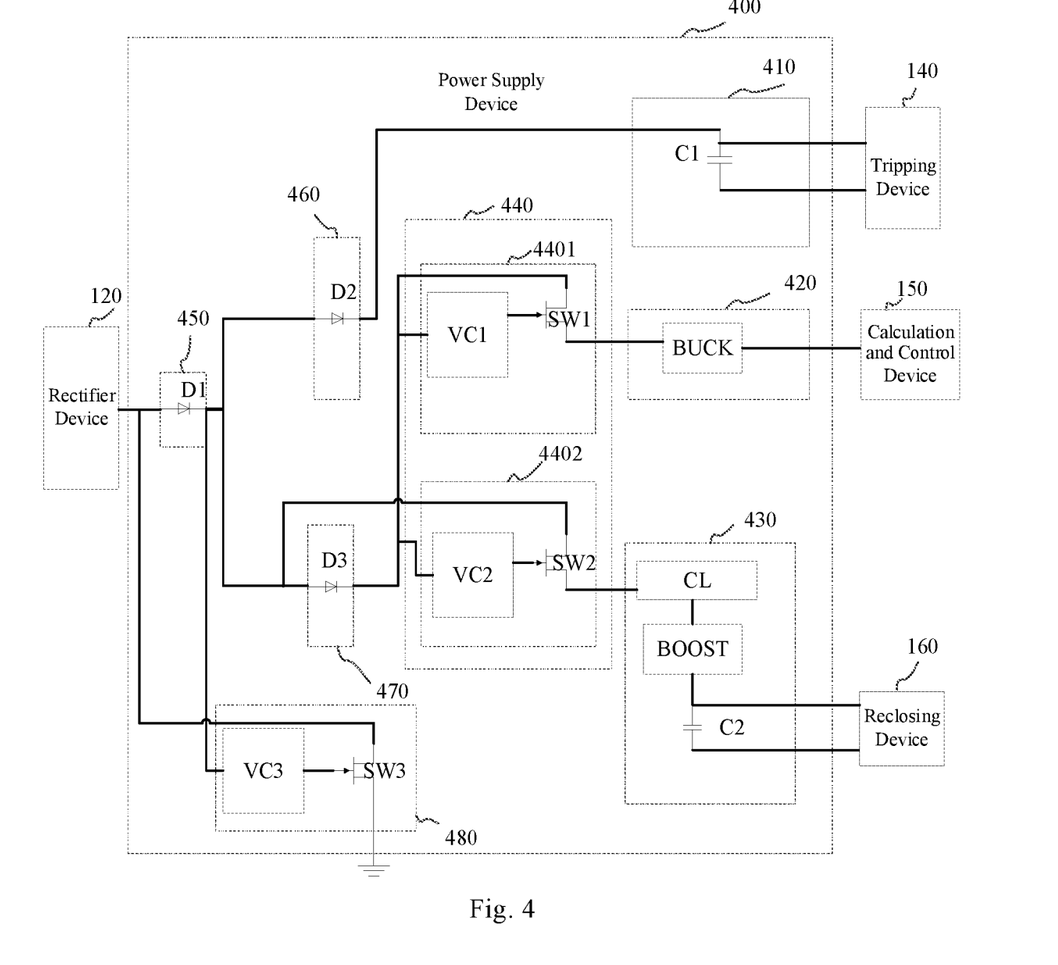
FIG. 4 shows a schematic circuit diagram of a power supply device according to an embodiment of the disclosure.

The respective units of the power supply device of the disclosure can be implemented by various specific circuits. FIG. 4 shows a schematic circuit diagram of a power supply device 400 according to an embodiment of the disclosure. It should be noted that the specific structures of respective units in FIG. 4 can be individually applied or replaced by other suitable structures.

As shown in FIG. 4, the first anti-reverse connection unit 450, the second anti-reverse connection unit 460 and the third anti-reverse connection unit 470 can be a first diode D1, a second diode D2 and a third diode D3 respectively. The anode of the first diode D1 is connected with the rectifier device 120, and the cathode of the first diode D1 is connected with the anodes of the second diode D2 and the third diode D3 respectively, for providing anti-reverse connection for the whole power supply device. The cathode of the second diode D2 is connected with the first power supplying unit 410, for providing further anti-reverse connection for the first power supplying unit 410. The cathode of the third diode D3 is connected with the first and second input terminals of the first control subunit 4401 respectively, so as to provide further anti-reverse connection for the subsequent second power supplying unit 420. The cathode of the third diode D3 is also connected with the first input of the second control subunit 4402, and the anode of the third diode D3 is also connected with the second input of the second control subunit 4402.

The first energy storing subunit included in the first power supplying unit 410 may be a capacitor C1, which is connected between the second anti-reverse connection unit 460 and the tripping device 140 and configured to receive and store power and utilize the stored power to supply the power to the tripping device 140. The capacitance value of the capacitor C1 may be set according to the practical configuration of the circuit. It should be noted that although the first energy storing subunit is shown as a capacitor C1 in FIG. 4, the first energy storing subunit is not limited to a capacitor, and in an embodiment, the first energy storing subunit may also be an energy storage battery.

The first power supply subunit included in the second power supplying unit 420 may be a buck circuit BUCK, which is connected between the first control subunit 4401 and the calculation and controlling device 150 and configured to receive the power and supply power to the calculation and controlling device 150 at the first output voltage required by the calculation and controlling device 150. The first output voltage may be set according to the practical configuration of the circuit.

The current limiting circuit included in the third power supplying unit 430 can be a common current limiter CL, which is connected between the second control subunit 4402 and the second power supply subunit, so that the current flowing from the rectifier device 120 into the second power supply subunit is less than or equal to a first current threshold Cth1. The first current threshold Cth1 may be set according to the practical configuration of the circuit. As described above, in an embodiment, the current limiting circuit included in the third power supplying unit 430 may also be a combination of the current limiter CL and the anti-reverse connection unit.

The second power supply subunit included in the third power supplying unit 430 may be a boost circuit BOOST, which is connected between the current limiting circuit and the second energy storing subunit and configured to receive the power and supply power to the second energy storing subunit at a second output voltage required by the second energy storing subunit, the second output voltage may be set according to the practical configuration of the circuit.

The second energy storing subunit included in the third power supplying unit 430 may be a capacitor C2, which is connected between the second power supply subunit and the reclosing device 160 and configured to receive and store the power and utilize the stored power to supply power to the reclosing device 160. The capacitance value of the capacitor C2 may be set according to the practical configuration of the circuit. It should be noted that although the second energy storing subunit is shown as a capacitor C2 in FIG. 4, the second energy storing subunit is not limited to a capacitor, in an embodiment, the second energy storing subunit may also be an energy storage battery.

The first control subunit 4401 may include a first hysteresis voltage comparing circuit VC1 and a first electronic switch SW1. The first electronic switch SW1 is connected between the output terminal of the third anti-reverse connection unit 470 and the second power supplying unit 420, the input terminal of the first hysteresis voltage comparing circuit VC1 is connected with the output terminal of the third anti-reverse connection unit 470, and the output terminal of the first hysteresis voltage comparing circuit VC1 is connected with the control terminal of the first electronic switch SW1. The input terminal of the first hysteresis voltage comparing circuit VC1 corresponds to the first input terminal of the first control subunit 4401, the terminal of the first electronic switch SW1 which is connected with the output terminal of the third anti-reverse connection unit 470 corresponds to the second input terminal of the first control subunit 4401, and the terminal of the first electronic switch SW1 which is connected with the second power supplying unit 420 corresponds to the output terminal of the first control subunit 4401.

The hysteresis voltage comparing circuit is a special voltage comparing circuit, and its transmission characteristics have the shape of "hysteresis" curve. The hysteresis voltage comparing circuit has two unequal thresholds. For example, when the input voltage gradually increases to the first threshold, the hysteresis voltage comparing circuit may output a high level, while when the input voltage gradually decreases to the second threshold, the hysteresis voltage comparing circuit can output a low level. In an embodiment of the disclosure, when the voltage at the input terminal of the first hysteresis voltage comparing circuit VC1 is higher than the first voltage threshold Vth1, the output terminal of the first hysteresis voltage comparing circuit VC1 outputs a control signal to close the first electronic switch SW1, so that the second power supplying unit 420 begins to receive the power; and when the voltage at the input terminal of the first hysteresis voltage comparing circuit VC1 is lower than the third voltage threshold Vth3, the output terminal of the first hysteresis voltage comparing circuit outputs a control signal to open the first electronic switch SW1, so that the second power supplying unit 420 stops receiving the power. The first voltage threshold Vth1 is higher than the third voltage threshold Vth3.

There are types of electronic switches for common usage, such as IGBT, GTO (Gate Turn-off Thyristor), transistor, MOS (metal oxide semiconductor) transistor, etc., these electronic switches can be selected by those skilled in the art according to practical application scenarios. For example, in the embodiment of the disclosure, if the first electronic switch SW1 is a MOS transistor, then its gate is the control terminal and is connected with the output terminal of the first hysteresis voltage comparing circuit VC1; its source and drain are connected with the second power supplying unit 420 (the input terminal of the buck circuit BUCK) and the output terminal of the third anti-reverse connection unit 470 (the third diode D3) respectively.

The second control subunit 4402 includes a second hysteresis voltage comparing circuit VC2 and a second electronic switch SW2, the second electronic switch SW2 is connected between the input terminal of the third anti-reverse connection unit 470 and the third power supplying unit 430, the input terminal of the second hysteresis voltage comparing circuit VC2 is connected with the output terminal of the third anti-reverse connection unit 470, the output terminal of the second hysteresis voltage comparing circuit VC2 is connected with the control terminal of the second electronic switch SW2. The input terminal of the second hysteresis voltage comparing circuit VC2 corresponds to the first input terminal of the second control subunit 4402, the terminal of the second electronic switch SW2 connected with the input terminal of the third anti-reverse connection unit 470 corresponds to the second input terminal of the second control subunit 4402, and the terminal of the second electronic switch SW2 connected with the third power supplying unit 430 corresponds to the output terminal of the second control subunit 4402. In an embodiment of the disclosure, when the voltage at the input terminal of the second hysteresis voltage comparing circuit VC2 is higher than the second voltage threshold Vth2, the output terminal of the second hysteresis voltage comparing circuit VC2 outputs a control signal to close the second electronic switch SW2, so that the third power supplying unit 430 begins to receive the power; when the voltage at the input terminal of the second hysteresis voltage comparing circuit VC2 is lower than the fourth voltage threshold Vth4, the output terminal of the second hysteresis voltage comparing circuit VC2 outputs a control signal to open the second electronic switch SW2, so that the third power supplying unit 430 stops receiving power. The second voltage threshold Vth2 is higher than fourth voltage threshold Vth4.

In an embodiment of the disclosure, if the second electronic switch SW2 is a MOS transistor, then its gate is the control terminal and is connected with the output terminal of the second hysteresis voltage comparing circuit VC2; its source and drain are connected with the third power supplying unit 430 (input terminal of the current limiter CL) and the input terminal of the third anti-reverse connection unit 470 (the third diode D3) respectively.

The protection unit 480 may include a third hysteresis voltage comparing circuit VC3 and a third electronic switch SW3, the third electronic switch SW3 is connected between the output terminal of the rectifier device 120 and the reference ground, the input terminal of the third hysteresis voltage comparing circuit VC3 is connected with the output terminal of the first anti-reverse connection unit 450, and the output terminal of the third hysteresis voltage comparing circuit VC3 is connected with the control terminal of the third electronic switch SW3. The input terminal of the third hysteresis voltage comparing circuit VC3 corresponds to the first input terminal of the protection unit 480, the terminal of the third electronic switch SW3 connected with the output terminal of the rectifier device 120 corresponds to the second input terminal of the protection unit 480, and the terminal of the third electronic switch SW3 connected with the reference ground corresponds to the output terminal of the protection unit 480.

In an embodiment of the disclosure, when the voltage at the input terminal of the third hysteresis voltage comparing circuit VC3 is higher than the fifth voltage threshold Vth5, the output terminal of the third hysteresis voltage comparing circuit VC3 outputs a control signal to close the third electronic switch SW3 to discharge excessive current and voltage to the reference ground and stop the first power supplying unit 410, the second power supplying unit 420 and the third power supplying unit 430 from receiving the power. When the voltage at the input terminal of the third hysteresis voltage comparing circuit VC3 is lower than the sixth voltage threshold Vth6, the output terminal of the third hysteresis voltage comparing circuit VC3 outputs a control signal to open the third electronic switch SW3 to enable the first power supplying unit 410 to begin to receive the power, so that the second power supplying unit 420 and the third power supplying unit 430 can also subsequently receive power based on the control of the control unit 440. The fifth voltage threshold Vth5 is higher than the sixth voltage threshold Vth6.

In the embodiment of the disclosure, if the third electronic switch SW3 is a MOS transistor, then its gate is the control terminal and is connected with the output terminal of the third hysteresis voltage comparing circuit VC3; its source and drain are connected with the reference ground and the output of the rectifier device 120 respectively.

Figure 5:
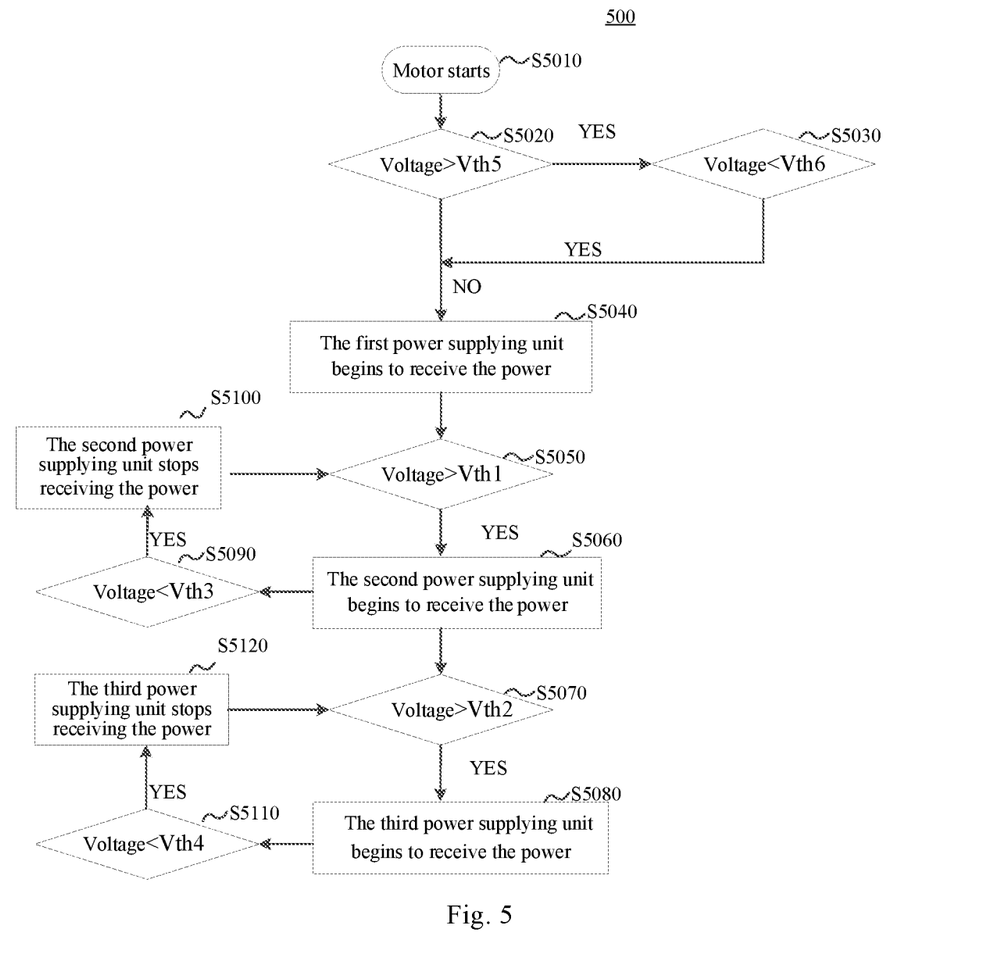
FIG. 5 shows an operation flowchart of a power supply device according to an embodiment of the disclosure.

FIG. 5 shows an operation flowchart of the power supply device according to an embodiment of the disclosure. The flowchart of FIG. 5 will be briefly explained with reference to the structure of the power supply device in FIG. 4. At S5010, the motor starts and power begins to be input into the power supply device. At S5020, the protection unit 380 of the power supply device continuously determines whether the voltage of the output terminal of the first anti-reverse connection unit 450 is higher than the fifth voltage threshold Vth5. If it is determined that the voltage is not higher than the fifth voltage threshold Vth5, the first power supplying unit 210 begins to receive power at S5040; otherwise, if it is determined that the voltage is higher than the fifth voltage threshold Vth5, the protection unit 380 prevents the first power supplying unit 210, the second power supplying unit 220 and the third power supplying unit 230 from receiving the power, so that the damage to the power supply device due to excessive current and voltage may be avoided. In addition, if the first power supplying unit 210, the second power supplying unit 220 and the third power supplying unit 230 do not receive the power, the protection unit 380 continuously monitors the voltage at the output terminal of first anti-reverse connection unit 450. At S5030, if the voltage of the output terminal of the first anti-reverse connection unit 450 is lower than the sixth voltage threshold Vth6, the protection unit 380 enables the first power supplying unit 210 to begin to receive the power at S5040. It should be noted that S5020 and S5030 are continuously implemented during the whole operation process of the power supply device, and they are not before or after S5040~S5120.

At S5050, the first control subunit 2401 determines whether the voltage at its first input terminal is higher than the first voltage threshold Vth1, and if the voltage is higher than the first voltage threshold Vth1, the first control subunit 2401 enables the second power supplying unit 220 to begin to receive the power at S5060.

At S5070, the second control subunit 2402 determines whether the voltage at its first input terminal is higher than the second voltage threshold Vth2, and if the voltage is higher than the second voltage threshold Vth2, the second control subunit 2402 enables the third power supplying unit 230 to begin to receive the power at S5080.

In addition, in a case that the second power supplying unit 220 receives the power, the first control subunit 2401 continuously monitors the voltage of its first input terminal, if the first control subunit 2401 determines that the voltage is lower than the third voltage threshold Vth3 at S5090, the first control subunit 2401 stops the second power supplying unit 220 from receiving the power at S5100.

In addition, in a case that the third power supplying unit 230 receives the power, the second control subunit 2402 continuously monitors the voltage at its first input terminal, if the second control subunit 2402 determines that the voltage is lower than the fourth voltage threshold Vth4 at S5110, the second control subunit 2402 stops the third power supplying unit 230 from receiving power at S5120.

Figure 6:
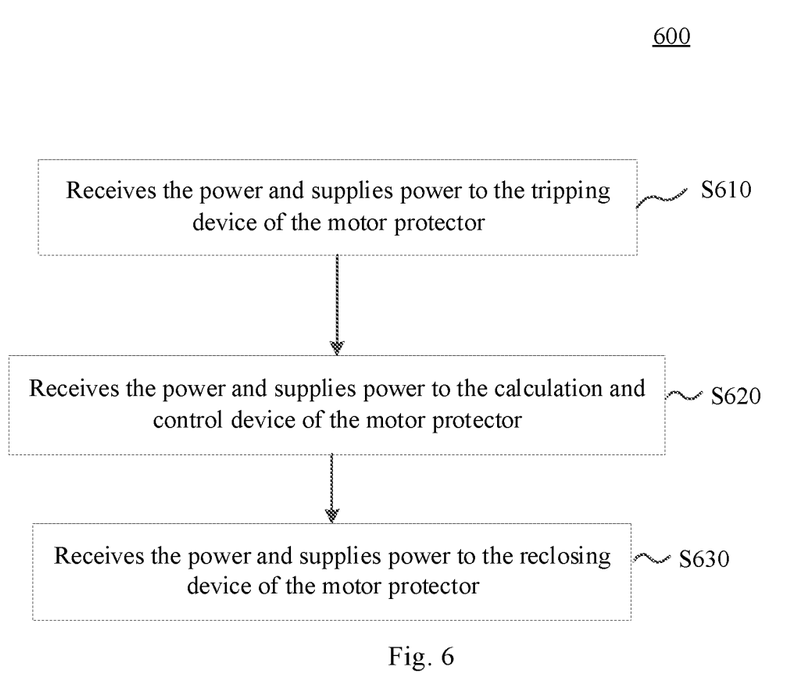
FIG. 6 shows a flowchart of a power supplying method of a power supply device for a motor protector according to an embodiment of the disclosure.

FIG. 6 shows a flowchart of a power supplying method 600 of a power supply device for a motor protector according to an embodiment of the disclosure. The motor protector receives power by inducing alternating current in a power supply line of a motor via the power supplying coil and converting the induced alternating current into direct current utilizing the rectifier device. The power supplying method 600 can be applied to a power supply device for a self-powered motor protector, for example, the power supply device described in FIGS. 1-4 above. The power supplying method 600 includes steps S610-S630. At step S610, the power supply device receives the power and supplies power to the tripping device of the motor protector. At step S620, the power supply device receives the power and supplies power to the calculation and control device of the motor protector. At step S630, the power supply device receives the power and supplies power to the reclosing device of the motor protector. The above mentioned steps can be performed by any suitable hardware or hardware combined with software of the power supply device. For example, the power supply device may include the above mentioned first power supplying unit, the second power supplying unit and the third power supplying unit. Step S610 may be performed by the first power supplying unit, that is, at step S610, the first power supplying unit receives and stores the power and supplies power to the tripping device of the motor protector. For example, step S620 can be performed by the above mentioned second power supplying unit, that is, at step S620, the second power supplying unit receives the power and supplies power to the calculation and control device of the motor protector. For example, step S630 may be performed by the above mentioned third power supplying unit, that is, at step S630, the third power supplying unit receives and stores the power and supplies power to the reclosing device of the motor protector. In addition, the power supply device also controls the order in which the first power supplying unit, the second power supplying unit and the third power supplying unit receive the power, so that the power is firstly received by the first power supplying unit, then received by the second power supplying unit and finally received by the third power supplying unit, in this way, the power is supplied to the tripping device of the motor protector firstly, and then to the calculation and control device of the motor protector and finally to the reclosing device of the motor protector. The above mentioned timing control can also be performed by any suitable hardware or hardware combined with software of the power supply device, for example, by the above mentioned control unit included in the power supply device.

According to the power supplying method of the embodiment of the disclosure, by controlling the order in which the first, the second and the third power supplying units receive power, the first power supplying unit can be given the highest priority for energy storage, so that the ground fault protection function can be started and implemented more quickly (for example, within 1 second) even in a case of small rated current. In addition, the third power supplying unit can receive the power and supply power to the reclosing device, so that the automatic reclosing function is also taken into account while implementing the ground fault protection function.

The whole hardware computing device or its components described in this disclosure can be implemented by various suitable hardware means, including but not limited to FPGA, ASIC, SoC, discrete gate or transistor logic, discrete hardware components, or any combination thereof.

The block diagrams of circuits, devices, apparatus, equipment and systems referred to in the disclosure are only taken as illustrative examples, and are not intended to require or imply that they must be connected, arranged and configured in the manner shown in the block diagrams. As will be recognized by those skilled in the art, these circuits, devices, apparatus, equipment and systems can be connected, arranged and configured in any manner as long as the desired purpose can be achieved.

It should be understood by those skilled in the art that the above specific embodiments are only examples and not limitations, and various modifications, combinations, partial combinations and substitutions can be made to the embodiments of this disclosure according to design requirements and other factors, as long as they are within the scope of the appended claims or their equivalents, that is, within the scope of the claims to be protected by this disclosure.

What is claimed is:

1. A power supply device for a motor protector, the motor protector receives power by inducing alternating current in a power supply line of a motor via a power supplying coil and converting the induced alternating current into direct current utilizing a rectifier device, the power supply device comprising:
   a first power supplying unit, configured to receive and store the power, and supply power to a tripping device of the motor protector;
   a second power supplying unit, configured to receive the power and supply power to a calculation and control device of the motor protector;
   a third power supplying unit, configured to receive and store the power, and supply power to a reclosing device of the motor protector; and
   a control unit, configured to control an order in which the first power supplying unit, the second power supplying unit and the third power supplying unit receive the power, so that the first power supplying unit, the second power supplying unit and the third power supplying unit do not receive the power at the same time, but that the power is firstly received by the first power supplying unit, and then received by the second power supplying unit and finally received by the third power supplying unit.

2. The power supply device according to claim 1, wherein the control unit comprises:
   a first control subunit connected between the rectifier device and the second power supplying unit, wherein a first input terminal of the first control subunit is connected with an output terminal of the rectifier device, an output terminal of the first control subunit is connected with the second power supplying unit, the first control subunit controls the second power supplying unit to begin to receive the power when a voltage at the first input terminal of the first control subunit is higher than a first voltage threshold; and a second control subunit connected between the rectifier device and the third power supplying unit, wherein a first input terminal of the second control subunit is connected with the output terminal of the rectifier device, an output terminal of the second control subunit is connected with the third power supplying unit, the second control subunit controls the third power supplying unit to begin to receive the power when a voltage at the first input terminal of the second control subunit is higher than a second voltage threshold, wherein the second voltage threshold is higher than the first voltage threshold.

3. The power supply device according to claim 2, wherein the first control subunit controls the second power supplying unit to stop receiving the power when the voltage at the first input terminal of the first control subunit is lower than a third voltage threshold, the third voltage threshold is lower than or equal to the first voltage threshold; and the second control subunit controls the third power supplying unit to stop receiving the power when the voltage at the first input terminal of the second control subunit is lower than a fourth voltage threshold, the fourth voltage threshold is lower than or equal to the second voltage threshold, wherein the fourth voltage threshold is higher than the third voltage threshold.

4. The power supply device according to claim 1, wherein the first power supplying unit comprises a first energy storing subunit, and the first energy storing subunit receives the power to store the power and supplies power to the tripping device of the motor protector by utilizing the stored power.

5. The power supply device according to claim 1, wherein the second power supplying unit comprises a first power supply subunit, the first power supply subunit receives the power and supplies power to the calculation and control device of the motor protector at a first output voltage required by the calculation and control device.

6. The power supply device according to claim 1, wherein the third power supplying unit comprises a second power supply subunit and a second energy storing subunit, the second power supply subunit receives the power and supplies power to the second energy storing subunit at a second output voltage required by the second energy storing subunit; and the second energy storing subunit receives the power provided by the second power supply subunit to store the power, and supplies power to the reclosing device by utilizing the stored power.

7. The power supply device according to claim 6, wherein the third power supplying unit further comprises a current limiting circuit connected between the second power supply subunit and the rectifier device, so that a current flowing from the rectifier device into the second power supply subunit is less than or equal to a first current threshold.

8. The power supply device according to claim 2, further comprising a first anti-reverse connection unit, a second anti-reverse connection unit and a third anti-reverse connection unit, wherein an input terminal of the first anti-reverse connection unit is connected with the output terminal of the rectifier device, and an output terminal of the first anti-reverse connection unit is connected with an input terminal of the second anti-reverse connection unit and an input terminal of a third anti-reverse connection unit respectively;

an output terminal of the second anti-reverse connection unit is connected with the first power supplying unit;

an output terminal of the third anti-reverse connection unit is connected with the first input terminal and a second input terminal of the first control subunit and the first input terminal of the second control subunit respectively, an input terminal of the third anti-reverse connection unit is connected with a second input terminal of the second control subunit.

9. The power supply device according to claim 8, further comprising a protection unit, wherein a first input terminal of the protection unit is connected with an output terminal of the first anti-reverse connection unit, a second input terminal of the protection unit is connected with the output terminal of the rectifier device, and an output terminal of the protection unit is connected with a reference ground, the protection unit enables the first power supplying unit, the second power supplying unit and the third power supplying unit to stop receiving the power when a voltage at the first input terminal of the protection unit is higher than a fifth voltage threshold; and the protection unit enables the first power supplying unit to begin to receive the power when the voltage at the first input terminal of the protection unit is lower than a sixth voltage threshold, the sixth voltage threshold is lower than the fifth voltage threshold.

10. The power supply device according to claim 8, wherein the first control subunit comprises a first hysteresis voltage comparing circuit and a first electronic switch, the first electronic switch is connected between the output terminal of the third anti-reverse connection unit and the second power supplying unit, an input terminal of the first hysteresis voltage comparing circuit is connected with the output terminal of the third anti-reverse connection unit, and an output terminal of the first hysteresis voltage comparing circuit is connected with a control terminal of the first electronic switch;

the second control subunit comprises a second hysteresis voltage comparing circuit and a second electronic switch, the second electronic switch is connected between the input terminal of the third anti-reverse connection unit and the third power supplying unit, an input terminal of the second hysteresis voltage comparing circuit is connected with the output terminal of the third anti-reverse connection unit, the output terminal of the second hysteresis voltage comparing circuit is connected with the control terminal of the second electronic switch;

wherein the output terminal of the first hysteresis voltage comparing circuit outputs a control signal to close the first electronic switch when the voltage at the input terminal of the first hysteresis voltage comparing circuit is higher than the first voltage threshold, so that the second power supplying unit begins to receive the power;

the output terminal of the first hysteresis voltage comparing circuit outputs a control signal to open the first electronic switch when a voltage at the input terminal of the first hysteresis voltage comparing circuit is lower than the third voltage threshold, so that the second power supplying unit stops receiving the power;

the output terminal of the second hysteresis voltage comparing circuit outputs a control signal to close the second electronic switch when the voltage at the input terminal of the second hysteresis voltage comparing circuit is higher than the second voltage threshold, so that the third power supplying unit begins to receive the power;

the output terminal of the second hysteresis voltage comparing circuit outputs a control signal to open the second electronic switch when the voltage at the input terminal of the second hysteresis voltage comparing circuit is lower than the fourth voltage threshold, so that the third power supplying unit stops receiving the power.

11. The power supply device according to claim 4, wherein
the first energy storing subunit is a capacitor.

12. The power supply device according to claim 5, wherein
the first power supply subunit is a buck circuit.

13. The power supply device according to claim 6, wherein
the second power supply subunit is a boost circuit, and the second energy storing subunit is a capacitor.

14. The power supply device according to claim 8, wherein
the first anti-reverse connection unit, the second anti-reverse connection unit and the third anti-reverse connection unit are diodes respectively, input terminals of the first anti-reverse connection unit, the second anti-reverse connection unit and the third anti-reverse connection unit are anodes of the diodes respectively, output terminals of the first anti-reverse connection unit, the second anti-reverse connection unit and the third anti-reverse connection unit are cathodes of the diodes respectively.

15. The power supply device according to claim 9, wherein
the protection unit comprises a third hysteresis voltage comparing circuit and a third electronic switch, the third electronic switch is connected between the output terminal of the rectifier device and the reference ground, the input terminal of the third hysteresis voltage comparing circuit is connected with the output terminal of the first anti-reverse connection unit, and the output terminal of the third hysteresis voltage comparing circuit is connected with the control terminal of the third electronic switch;

wherein the output terminal of the third hysteresis voltage comparing circuit outputs a control signal to close the third electronic switch when a voltage at the input terminal of the third hysteresis voltage comparing circuit is higher than the fifth voltage threshold, so that the first power supplying unit, the second power supplying unit and the third power supplying unit stop receiving the power; and wherein the output terminal of the third hysteresis voltage comparing circuit outputs a control signal to open the third electronic switch when the voltage at the input terminal of the third hysteresis voltage comparing circuit is lower than the sixth voltage threshold, so that the first power supplying unit begins to receive the power.

16. A power supplying method of a power supply device for a motor protector, the motor protector receives power by inducing alternating current in a power supply line of a motor via a power supplying coil and converting the induced alternating current into direct current utilizing a rectifier device, the power supply device comprises a first power supplying unit, a second power supplying unit, a third power supplying unit and a control unit, the power supplying method comprising:

by the first power supplying unit, receiving and storing the power and supplying power to a tripping device of the motor protector;

by the second power supplying unit, receiving the power and supplying power to a calculation and control device of the motor protector;

by the third power supplying unit, receiving and storing the power and supplying power to a reclosing device of the motor protector, wherein, the control unit controls an order in which the first power supplying unit, the second power supplying unit and the third power supplying unit receive the power, so that the first power supplying unit, the second power supplying unit and the third power supplying unit do not receive the power at the same time, but that the power is firstly received by the first power supplying unit, then received by the second power supplying unit and finally received by the third power supplying unit.

* * * * *